Aug. 12, 1952     A. L. ZEMBROSKY ET AL     2,606,735
DISPLAY RACK
Filed Jan. 27, 1949     2 SHEETS—SHEET 1
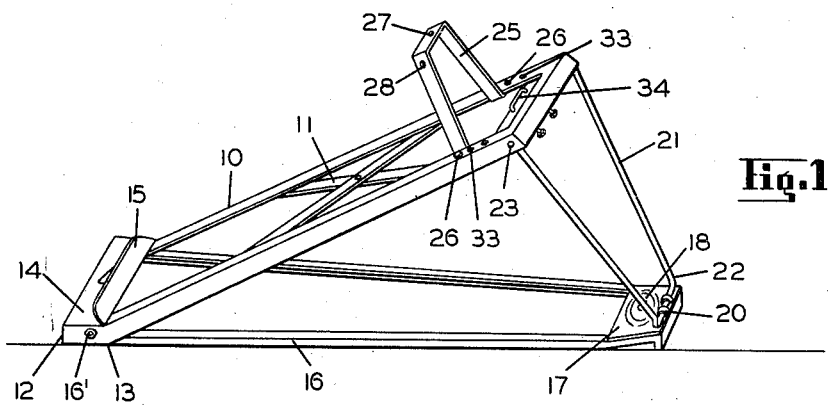
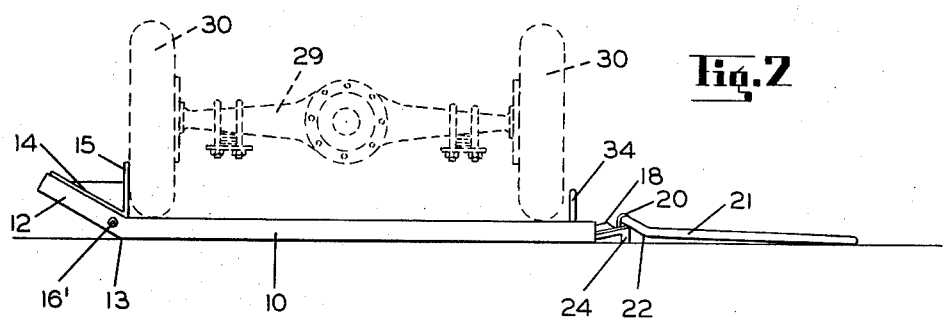
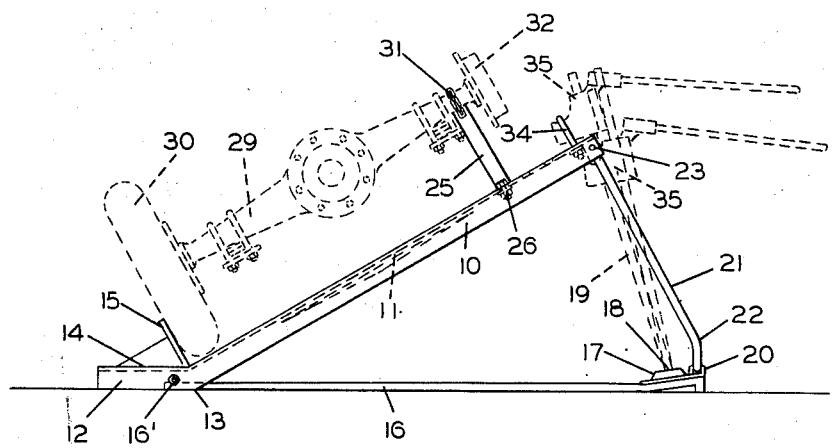
INVENTORS
ABRAHAM L. ZEMBROSKY
JOSEPH YAMPOL
HARRY N. YAMPOL
BY Christian R. Nielsen
ATTORNEY.

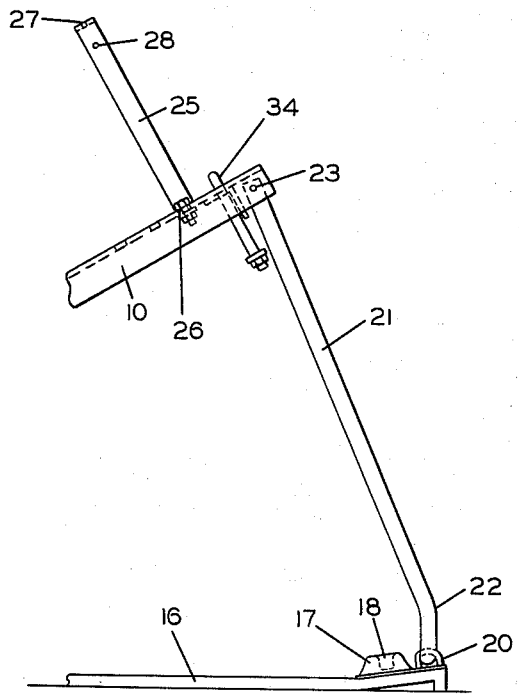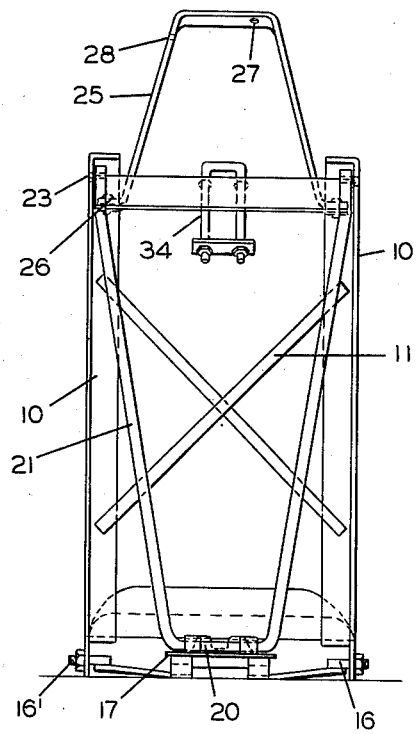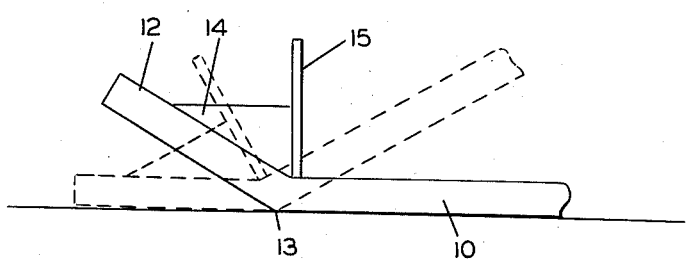

Patented Aug. 12, 1952

2,606,735

UNITED STATES PATENT OFFICE 2,606,735

DISPLAY RACK

Abraham L. Zembrosky, Joseph Yampol, and Harry N. Yampol, Milwaukee, Wis.

Application January 27, 1949, Serial No. 73,062

1 Claim. (Cl. 248—352)

Our invention relates to display racks and more particularly to racks for displaying automotive vehicles.

The object of our invention is to provide display means that will permit an observer to view the bottom of a vehicle mounted thereon.

Another object of our invention is to provide display means onto which the vehicle may be driven on its own power.

Still another object of our invention is to provide a display rack adaptable for use with any conventional "bumper" type of jack in its manipulation.

A further object of our invention is to provide a display rack of the character described, that will accommodate various types and sizes of vehicles.

The device lends itself to efficiently perform the function for which it is intended, may be economically manufactured and may be operated without extraordinary mechanical skill or special tools.

Other and further objects of our invention will become more apparent as the description proceeds and when taken in conjunction with the drawings in which Figure 1 is a perspective view of the assembled device in an open position.

Figure 2 is a side view of the device in a folded position showing the rear axle and wheels of an automobile in phantom.

Figure 3 is a side view of the assembled device showing a rear axle assembly of an automobile in phantom attached thereto, and illustrating the position of the jack used in its manipulation.

Figure 4 is a fragmentary enlarged view of the raised end of the device, illustrating the manner in which the retaining member is attached and supports the device in an inclined position.

Figure 5 is an end view of the assembled device in a raised position, and

Figure 6 is a fragmentary end portion of the device illustrating its pivoted action.

Similar characters of reference indicate corresponding parts throughout the several views and referring now to the same, the character 10 shows a rectangular frame which is constructed of structural steel or the like, and which is shown reinforced at 11 to provide rigidity to the frame. The forward end 12 of the frame 10 is slightly angularly disposed in an upward manner, thereby providing a pivot point shown as 13, and an angular plate shown as 14 is attached to the upper surface of the frame and is provided with a plate member 15 which extends upward at right angle to the frame 10.

Obviously the entire top of the frame 10 may be covered with a metallic plate, if desired, and this plate may be equipped with a plurality of recessed lights for the purpose of illuminating the bottom of the vehicle disposed thereon.

Within the frame member 10 below its upper plate is shown a base member 16 which is hingedly attached to the frame 10 at 16' and is provided with a plate 17 at its rearward end. This plate 17 is formed to provide an engaging depression 18 to support the vertical rod 19 of the bumper jack assembly which is shown in phantom in Figure 3. The plate 17 also supports a hinge member 20 and hingedly supports the lower end of the retaining member 21 which is shown formed at an angle at 22 and which is supported by means of the bolts 23 to the frame 10 when the device is in a raised or inclined position.

The frame 10 is shown angularly disposed and it is raised by means of the downwardly extending ends 24 forming a part of the base 16, thereby making it possible to better support the vertical rod 19 of the jack assembly.

Extending upward from the upper face of the frame 10 is a U-shaped rest member 25 which is attached to the frame 10 at 26 and is provided with an aperture 27 at its top and an aperture 28 at its side. This U-shaped rest member 25 is employed as shown in Figure 3 to support one end of the axle of the vehicle, which axle is shown in phantom as 29, when one of the wheels which is shown in phantom as 30 is removed from the axle. The axle 29 is retained in position on the U-shaped member by applying a clamping means which we illustrate as a chain 31 and which is disposed through the apertures 27 and 28 in the member 25. The removal of one of the wheels 30 will leave only a brake drum 32 and will permit better visibility when viewing the bottom of the vehicle which is supported by an inclined device.

When the device is brought to a folded position as shown in Figure 2, it is possible to bring the vehicle on top of the frame with its own power, and a pair of the complete units may be spaced apart from one another to accommodate the variations in the wheel base of the vehicle so that the front wheels will rest on one unit and the rear wheels will rest on another unit. The U-shaped member 25 may then be slidably adjusted and retained in proper position below the axle 29 by employing the bolts engaging one of the plurality of apertures 33 on the frame 10. One of the wheels 30 is then removed and the axle is held in position on the member 25 by means of the clamping arrangement shown as 31.

There is a U-bolt 34 extending through a portion near the rear end of the frame 10. This bolt 34 is employed for engagement of the jack head which is shown in phantom as 35 in Figure 3, and when the rear end of the frame 10 is raised from the floor at a predetermined height by the jack head 35, the frame 10 pivoted on the point 13 may be blocked so that the jack head 35 may be placed below the end of the frame 10 as shown in the other position in Figure 3, and the frame end may then be raised to a height where it is possible to engage the depending end of the retaining member 21 with the frame 10 by means of the bolts 23 and the jack head 35 may then be removed and the vehicle will be resting on a pair of display devices in an inclined position. At this point the forward end 12 of the frames 10 rest flat on the floor and the vehicle is suspended at an angle that prevents any overbalance or tipping, yet makes it possible for the observer to view the bottom of the vehicle as well as its sides.

The device is portable and adjustable to accommodate any size of automobile or the like and may be placed into operation by any person without special tools, without special mechanical knowledge or skill, and although we have shown a particular arrangement of the component parts constituting the device, we are fully cognizant of the fact that many changes may be made in the form and configuration of the various parts without effecting their operativeness or efficiency, and we reserve the right to make such changes as we may deem convenient without departing from the spirit of our invention or the scope of the appended claim.

Having thus described our invention, what we claim and desire to secure by Letters Patent in the United States is:

A device of the character described to be used in combination with a jack, said device comprising a rectangular frame, a base, said frame hingedly attached to one end of said base, a retaining member, said retaining member hingedly attached to said base at the rearward end, a rest member extending upward from said frame at the rearward end, said rest member supported in a slidable adjustable manner, a U-bolt attached to said frame near the rearward end thereof for the engagement of said jack, and means for attaching the depending end of said retaining member to said frame to support the frame in an inclined position, due to the pivoted action caused by said jack.

ABRAHAM L. ZEMBROSKY.
JOSEPH YAMPOL.
HARRY N. YAMPOL.

REFERENCES CITED

The following references are of record in the file of this patent:

UNITED STATES PATENTS

| Number | Name | Date |
|---|---|---|
| 1,557,449 | Fennell | Oct. 13, 1925 |
| 1,564,594 | Leh | Dec. 8, 1925 |
| 2,147,347 | Jury | Feb. 14, 1939 |